United States Patent
Vallström et al.

(10) Patent No.: US 6,804,212 B1
(45) Date of Patent: Oct. 12, 2004

(54) METHOD AND ARRANGEMENT FOR ESTABLISHING A CONNECTION BETWEEN A BASE STATION AND MOBILE STATION

(75) Inventors: Jari Vallström, Oulu (FI); Harri Jokinen, Hiisi (FI); Jaakko Vihriälä, Oulu (FI)

(73) Assignee: Nokia Mobile Phones Ltd., Espoo (FI)

( * ) Notice: Subject to any disclaimer, the term of this patent is extended or adjusted under 35 U.S.C. 154(b) by 860 days.

(21) Appl. No.: 09/585,130

(22) Filed: Jun. 1, 2000

(30) Foreign Application Priority Data

Jun. 1, 1999 (FI) .................................................. 991245
Sep. 1, 1999 (FI) ............................................. 19991853

(51) Int. Cl.[7] .................................................. H04J 3/16
(52) U.S. Cl. ...................................... 370/331; 370/328
(58) Field of Search ................................. 370/328, 329, 370/338, 341, 331

(56) References Cited

U.S. PATENT DOCUMENTS

| | | | | |
|---|---|---|---|---|
| 5,479,409 A | * | 12/1995 | Dupuy et al. | |
| 5,831,974 A | * | 11/1998 | Suonvieri | |
| 6,201,819 B1 | * | 3/2001 | Luders | 370/508 |
| 6,240,076 B1 | * | 5/2001 | Kanerva et al. | 370/330 |
| 6,304,759 B1 | * | 10/2001 | Jiang et al. | 455/502 |
| 6,363,261 B1 | * | 3/2002 | Raghavan | 455/561 |
| 6,477,151 B1 | * | 11/2002 | Oksala | 370/314 |

FOREIGN PATENT DOCUMENTS

WO    WO 96/16522    5/1996

OTHER PUBLICATIONS

"Mobile Radio Communication Standards And Systems", Ju. A. Gromakov, Electronic Communications Technologies, vol. 67, 1996.

* cited by examiner

*Primary Examiner*—Kenneth Vanderpuye
(74) *Attorney, Agent, or Firm*—Perman & Green, LLP (57) ABSTRACT

The invention relates to a method and arrangement for establishing a connection between a base station and mobile station. The invention is especially applicable to digital TDMA (Time Division Multiple Access) and CDMA (Code Division Multiple Access) cellular systems which use extended cell operating ranges. An idea of the invention is that when establishing a connection a mobile station transmits access bursts using a preferably extended timing advance different from zero. In one embodiment, different timing advance values are used until a timing advance is found with which the burst falls on a CCCH channel time slot at the base station. The mobile station preferably transmits the first bursts using the normal timing advance, the next bursts using a second timing advance, the corresponding timing advance parameter value being the normal timing advance parameter maximum value+1, and the subsequent bursts using a timing advance of 2×the second timing advance, etc. This goes on until a response message arrives from the base station or until the mobile station has gone through the whole legal timing advance range. Using the solution according to the invention, extended cells can be realized without substantially reducing the data transmission capacity of cells.

24 Claims, 6 Drawing Sheets

METHOD AND ARRANGEMENT FOR ESTABLISHING A CONNECTION BETWEEN A BASE STATION AND MOBILE STATION

The invention relates to a method and arrangement for establishing a connection between a base station and mobile station. The invention is especially applicable to digital TDMA (Time Division Multiple Access) and CDMA (Code Division Multiple Access) cellular systems which utilize extended cell operating ranges. One such TDMA cellular system is the GSM (Global System for Mobile telecommunications) which uses the 450-MHz frequency band.

In its active state a terminal of a cellular radio system always attempts to select a coverage area, or cell, of a given base station to camp on. Conventionally, the selection of the cell has been based on measuring the strength of a received radio signal either at the terminal or at the base station. In the GSM, for example, each base station transmits a signal on a so-called Broadcast Control Channel (BCCH) which is given different frequencies for adjacent base stations, and the terminals measure the strengths of the BCCH signals received, and decide on the basis of the measured strengths which cell is the most advantageous in regard to the radio link quality. The base stations also transmit to the terminals information about the BCCH frequencies used in the neighboring cells so that the terminals know what frequencies they have to listen to in order to find the BCCH transmissions of the neighboring cells. In each cell the BCCH transmission also includes information about how the terminals can make so-called random access requests in that particular cell in order to establish connections for calls. The base stations use the System Information message, for example, to transmit the information.

In TDMA systems, information is usually transmitted in time slots of a TDMA frame at a certain operating frequency. In order for the bursts transmitted by a mobile station to be timed correctly for the right time slot the transmission moment of the mobile station must be determined also on the basis of the distance between the mobile station and base station in such a manner that the propagation delay of the burst provides for a timing advance for the mobile station's transmission time. For example, in the GSM the maximum timing advance is 233 $\mu$s, corresponding to a 35-km propagation delay. The mobile station's timing advance parameter may take values from 0 to 63, where 63 corresponds to the maximum timing advance 233 $\mu$s.

Figure 1:
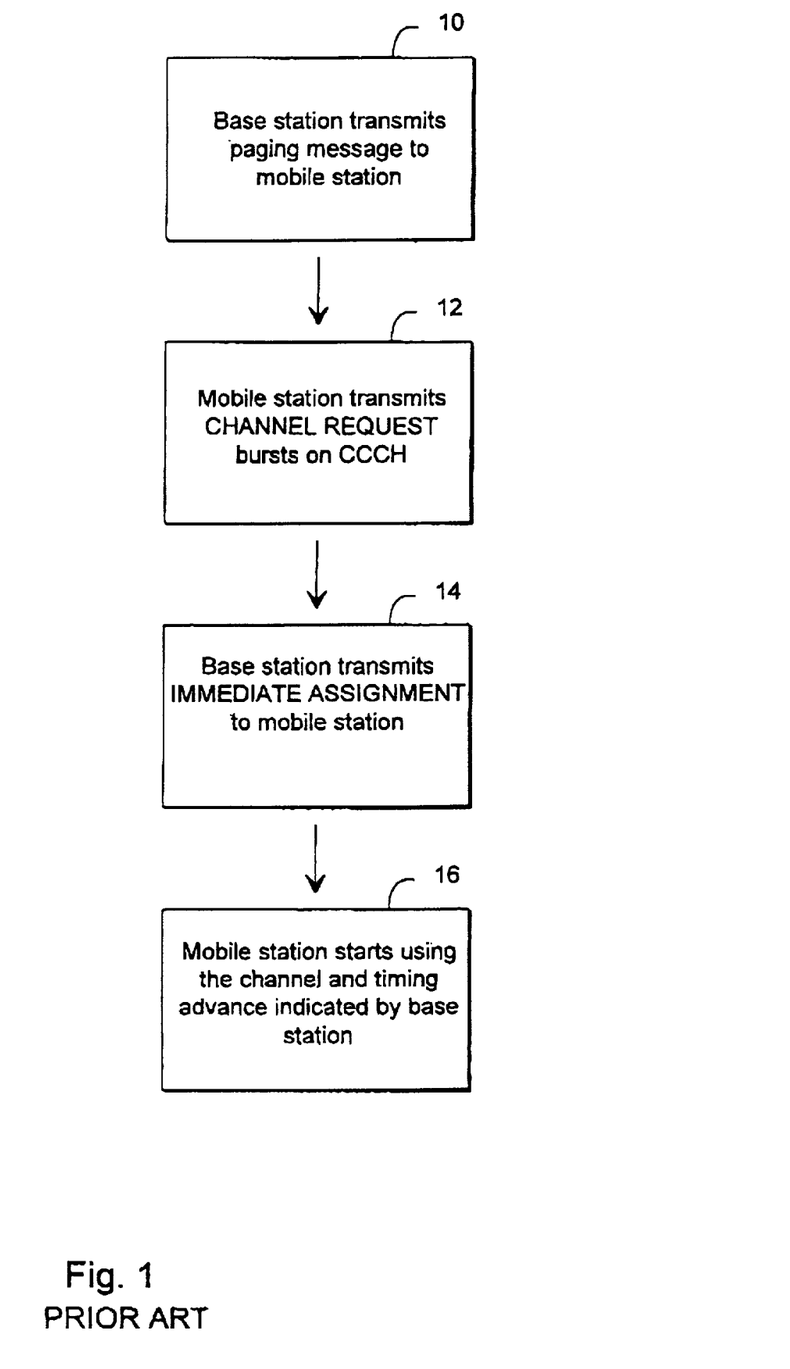
FIG. 1 shows a flow diagram of a known procedure for establishing a connection with a serving base station in a GSM system.

FIG. 1 shows in the form of a flow diagram a procedure according to the GSM for establishing a connection with a base station. The procedure may start e.g. when a call directed to a given mobile station arrives at the switching center MSC of the traffic area in which the called subscriber is located at that moment. The switching center transmits a paging request to one or more base stations in that particular traffic area, which base stations are those to whose coverage areas the called subscriber is registered. The base stations transmit a paging message onto the radio path through their paging channels PCH, phase 10. A mobile station that notices a subscriber identifier belonging to it on the paging channel that it monitors will transmit a CHANNEL REQUEST message to the base station, 12. If the user of the mobile station wants to establish a connection, it is initiated by transmitting to the base station a corresponding CHANNEL REQUEST message, 12. This message is transmitted in a random access type burst on a RACH channel. Having received the CHANNEL REQUEST message the base station determines a timing advance value for the mobile station and transmits it and other information concerning the connection to the mobile station in an IMMEDIATE ASSIGNMENT message, 14. The mobile station then starts using the traffic channel and timing advance value indicated by the base station, 16.

Figure 2:
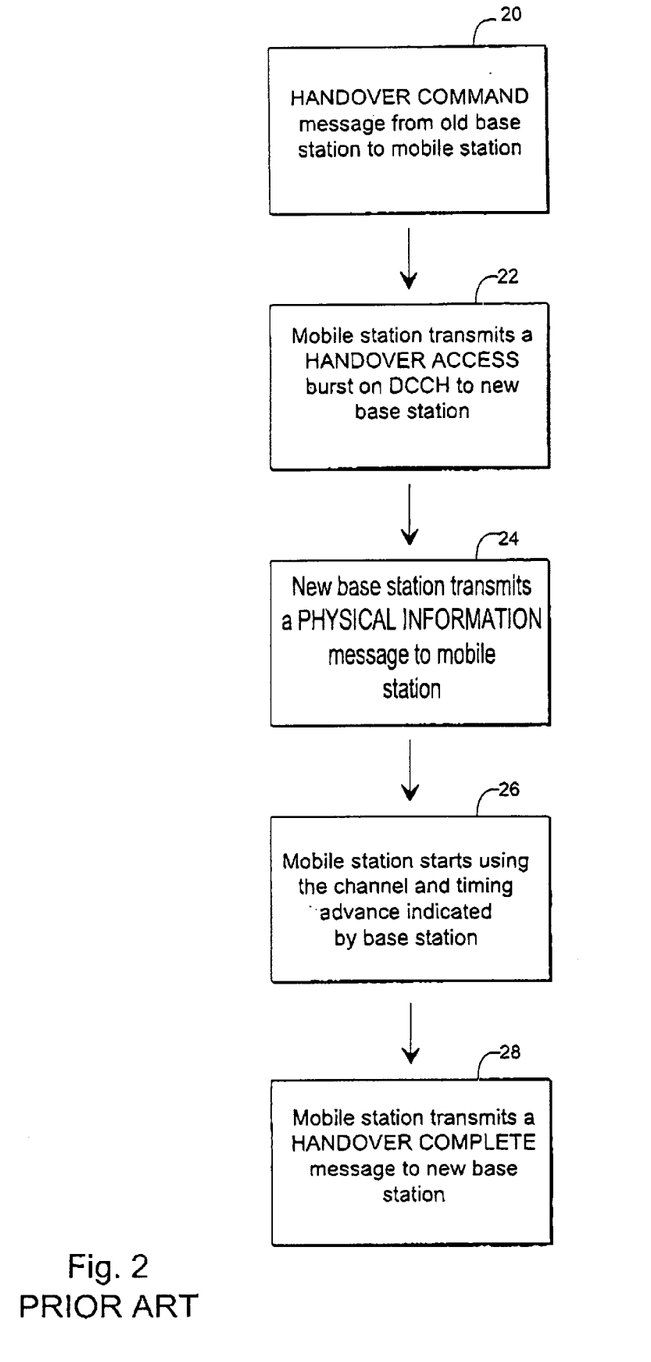
FIG. 2 shows a flow diagram of a known procedure for changing the serving base station in a GSM system.

FIG. 2 is a flow diagram depicting a procedure according to the GSM for making handover between the serving base stations. First, the current serving base station sends a HANDOVER COMMAND message to the mobile station, phase 20. This message indicates the new serving base station. Then the mobile station sends to the new base station HANDOVER ACCESS bursts, phase 22. These random access type bursts are transmitted on a Dedicated Control CHannel (DCCH). Having received the HANDOVER ACCESS message the new base station determines a timing advance value for the mobile station and transmits it and other related information to the mobile station in a PHYSICAL INFORMATION message, phase 24. If the handover is synchronous, however, the mobile station already knows the timing advance. The mobile station then starts using the traffic channel and timing advance value indicated by the base station, phase 26. Finally, the mobile station transmits to the new serving base station a HANDOVER COMPLETE message, phase 28, whereafter the old base station no longer serves the mobile station.

In some cases it has become necessary in TDMA systems to introduce so-called extended cells in which the operating range could be greater than the normal range 35 km (for example). One reason for this need is the introduction of lower frequencies. For instance, a 450-MHz GSM system could operate at a distance of up to 120 km from base station as far as the allowable transmission power is concerned because signal attenuation in relation to the distance is smaller than at higher operating frequencies. However, problems are then caused by the fact that the maximum timing advance is not sufficient to compensate for the propagation delay of the signal.

Figure 3:
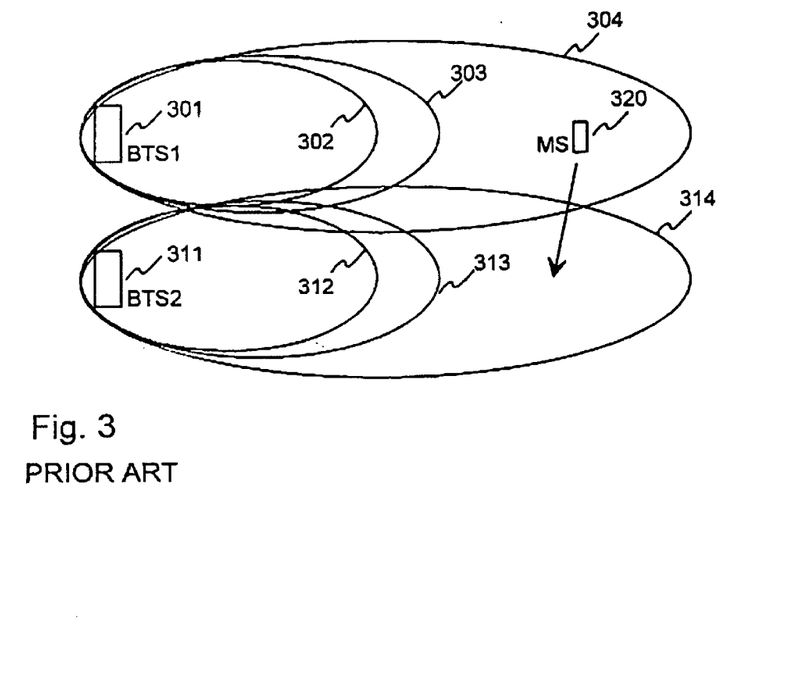
FIG. 3 shows conventional and extended cells in a GSM system.

FIG. 3 shows two base stations BTS1 301 and BTS2 311 of a cellular system according to the prior art and their operating ranges. Cells 302 and 312 of the base stations are conventional cells in which the maximum operating range is 30 km from the base station. At that distance the timing advance is 54. Cells 303 and 313 of the base stations are conventional cells, too, with a maximum operating range of 35 km from the base station, in which case the timing advance is 63. As said, this timing advance is the maximum timing advance in a conventional GSM system. Cells 304 and 314 are extended cells in which the maximum operating range from the base station is 120 km. The maximum timing advance parameter required in this case is 215.

FIG. 3 also shows a mobile station MS 320. When the mobile station is moving in the direction of the arrow it is first connected with base station BTS1 and, after a while, it has to make handover from BTS1 to BTS2. If the system allows for timing advance parameters greater than 63, the problem is how to transmit an access request from the mobile station to base station in such a manner that the base station is able to receive it. Normally the mobile station sends the random access request with a timing advance parameter value 0. If, however, the correct timing advance parameter value were greater than 63, the random access request would not arrive at the base station within the time window reserved for the message.

Figure 4:
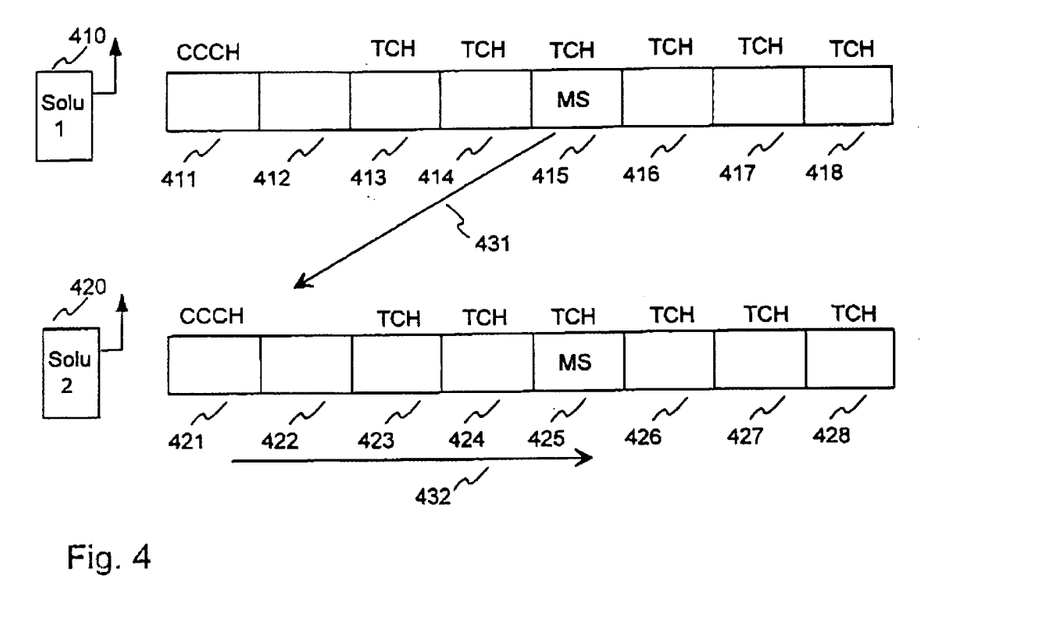
FIG. 4 illustrates the use of time slot channels of a TDMA frame when changing the serving base station.

FIG. 4 illustrates a situation in which a mobile station becomes connected to a base station/makes handover serving base stations. The figure shows a TDMA frame in a possible current cell 1, 410, comprising time slots 411 to 418. Time slot 411 contains a control channel CCCH. The potential traffic channel of the mobile station MS is located in time slot 415 in this cell. Let us consider a situation in which the mobile station establishes a connection with cell 2, 420. In this case the extended cell comprises TDMA time slots 421 to 428. The mobile station transmits a CHANNEL REQUEST or HANDOVER ACCESS burst to the control channel of cell 2. This is depicted by arrow 431. When the mobile station after that learns the correct timing advance of cell 2, it can transmit on the traffic channel TCH allotted to it, located in this case in time slot 425. This is depicted by arrow 432.

In the case of an extended cell, the second time slot 422 of the TDMA frame cannot be used as a traffic channel because the HANDOVER ACCESS burst uses the time slot 422 if the mobile station is located farther than the operating range of a normal cell. In that case the base station must be able to receive the ACCESS burst also at time slot 422. If the CCCH time slot is followed by a time slot for receiving the ACCESS BURST, it is possible to operate at a distance of a propagation delay of 580 µs. Then it would be possible to use a maximum value of 219 for the timing advance parameter in cells that support the extended operating range. The value 219 is obtained by adding to the normal maximum value 63 the length of one time slot in bits, i.e. 156. However, a disadvantage of this solution is that it reduces the data transmission capacity reserved for the traffic channels.

The object of the invention is to provide a solution for establishing a connection between a mobile station and base station, by means of which the aforesaid disadvantages associated with the solutions of the prior art can be avoided.

An idea of the invention is that when establishing a connection a mobile station transmits access bursts using a preferably extended timing advance different from zero. The mobile station preferably uses different timing advances until with a certain timing advance the burst hits a CCCH channel time slot in the base station. The mobile station preferably transmits the first bursts using the normal timing advance, the next bursts using a second timing advance, the corresponding timing advance parameter value being the normal timing advance parameter maximum value+1, and the subsequent bursts using a timing advance of 2× the second timing advance, etc. This goes on until a response message arrives from the base station or until the mobile station has gone through the whole timing advance range available.

The invention eliminates the need to reserve an extra time slot off traffic channel use, and the traffic capacity can thus be increased. In addition, since there is no need to monitor CHANNEL REQUEST and HANDOVER ACCESS bursts during two successive time slots, there is less need for changes in the base station's digital signal processing algorithms in conjunction with the introduction of the extended operating range. By means of the solution a conventional system can thus simply be turned into a system utilizing extended cells.

The method according to the invention for establishing a connection between a mobile station and base station, where extended timing advance is used in actual data transmission and where the mobile station transmits an access burst to the base station, is characterized in that the access burst is transmitted using a timing advance value that differs from zero.

A cellular system according to the invention which comprises means for changing the serving base station in a time-division cellular network, where extended timing advance is used in the actual data transmission between the base station and mobile station and where the system comprises means for receiving an access burst from the mobile station, is characterized in that the base station comprises means for receiving an access burst that has a timing advance value different from zero.

A mobile station according to the invention which comprises means for establishing a connection between the mobile station and base station in a cellular network, where extended timing advance is used in the actual data transmission between the base station and mobile station and the mobile station comprises means for transmitting an access burst to the base station, is characterized in that the mobile station comprises means for transmitting an access burst that has a timing advance value different from zero.

Preferred embodiments of the invention are presented in the dependent claims.

Extended timing advance means in this patent application that the maximum value of the timing advance used corresponds to the propagation time delay which causes the access burst to shift outside the normal time slot window.

The invention will now be described in more detail with reference to the accompanying drawings wherein.

FIGS. 1 to 4 were already discussed in connection with the description of the prior art, so the invention is below described mainly with reference to FIGS. 5 to 7.

Figure 5:
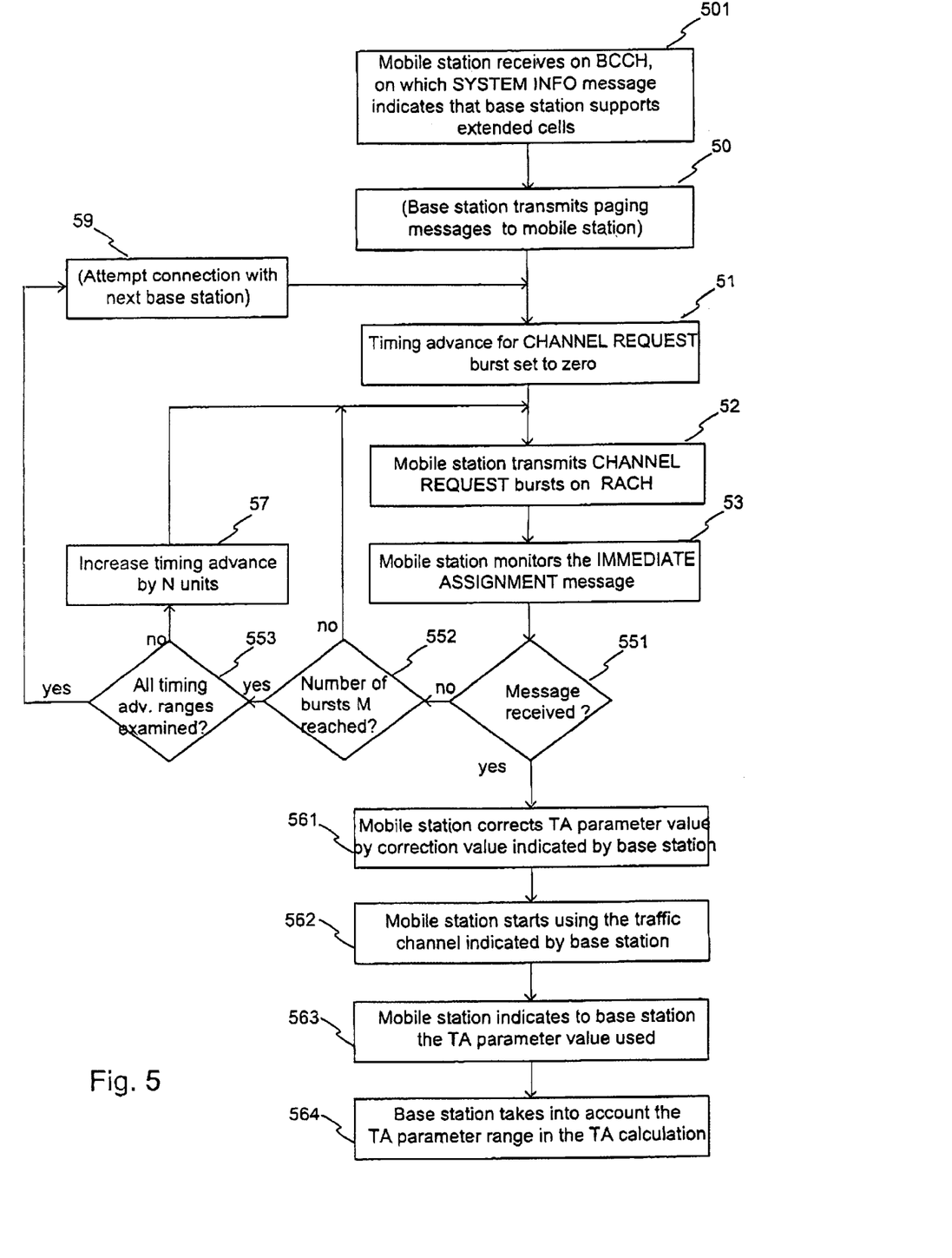
FIG. 5 shows a flow diagram of a method according to the invention for establishing a connection with a serving base station.

FIG. 5 shows a flow diagram of a method according to the invention for establishing a connection with a serving base station. Having been switched into the active state the mobile station receives base station transmissions on broadcast channels. A System Information message sent on the broadcast control channel BCCH includes information about whether the base station in question supports extended cells. This information may be included e.g. in the "Cell Options" field in the SYSTEM INFORMATION TYPE message. Alternatively, some other transmission channel may be used, such as e.g. the SACCH channel allocated to the mobile station. This way, the mobile station can perform measurements, if necessary, on the BCCH of a base station that is known to support extended cells, phase 501.

The mobile station then waits for a need to arise to establish a signaling connection with the serving base station. This need may arise when the base station sends a paging message to the mobile station, phase 50, or when the user of the mobile station wants to initiate a call. The mobile station then sets the timing advance parameter value used in the random access burst, TA=0, phase 51, and first transmits CHANNEL REQUEST messages on the RACH channel in the conventional manner using the timing advance value that was set, i.e. TA=0, phase 52.

The mobile station also monitors the IMMEDIATE ASSIGNMENT messages transmitted by the base station, phase 53. The mobile station transmits RACH bursts until it receives a response from the base station, phase 551, or until a predetermined maximum number M of RACH bursts have been transmitted, 552. The base station indicates in the system info message the allowed maximum number of RACH bursts, so M preferably equals this value received from the base station. If, after M bursts, the mobile station has not yet received a response message from the base station, a mobile station according to the prior art would begin to transmit RACH bursts to a second base station. However, a mobile station according to the invention increases the timing advance used in the RACH burst by N, which preferably equals the number of timing advance parameters used in normal operation, phase 57. In this case N=64, so the mobile station sets the RACH burst timing advance value TA=64 and begins to transmit RACH bursts to the same base station using this new timing advance, phase 52.

If the mobile station still does not receive a response from the base station, it further increases the timing advance parameter value by N, phase 57, so in this case the new value for the timing advance parameter is TA=128. The mobile station then transmits a maximum of M RACH bursts to the same base station using the new timing advance. If the mobile station still does not receive a response from the base station, it further increases the timing advance parameter value by N, i.e. sets the timing advance value TA=192, and begins to transmit RACH bursts to the same base station using this timing advance. Thus in successive stages the mobile station determines whether the distance between the mobile station and base station corresponds to timing advance value 0–63, 64–127, 128–191 or 192–255. If the mobile station does not receive an IMMEDIATE ASSIGNMENT message from the base station for a RACH burst transmitted using any of the aforesaid timing advance parameters, it attempts a connection with the next base station, phases 553, 59.

As the mobile station receives an IMMEDIATE ASSIGNMENT message from the base station it then sets the value of the timing advance parameter TA such that the value equals the value used in the last such RACH burst to which the base station responded summed with a timing advance correction value indicated in the IMMEDIATE ASSIGNMENT message, phase 561, and starts to use the traffic channel indicated by the base station, phase 562. In phase 563 the mobile station transmits a message to the base station on the SACCH channel indicating the timing advance parameter value used. Then, if the base station learns that the timing advance value used by the mobile station is not within the range 0–63, it takes the real timing advance into account when determining the next timing advance values, 564. When receiving the next timing advance value from the base station the mobile station may verify whether the base station took into account the timing advance step used by the mobile station, after which the mobile station starts to use the timing advance parameter values indicated by the base station.

It should be noted that the principle according to the invention is not limited to the aforementioned maximum timing advance values but by increasing the transmission stages of ACCESS bursts it is possible to cover timing advances considerably greater and, thus, greater distances between the mobile station and base station. Nor is the principle limited to the use of 64 normal-range timing advance parameters as the step of change of the amount of timing advance in successive stages. The step N may be smaller, in which case the coverage of a certain timing advance range requires more transmission stages of RACH bursts transmitted with different timing advance values. The advantage, however, would be that this way the interference caused by the RACH bursts on the time slot preceding the CCCH time slot, due to timing inaccuracies in the mobile station, would be smaller. Correspondingly, the step N may naturally adopt greater values as well. The mobile station may also be allowed to use an initial timing advance value other than zero if it has preliminary knowledge of the distance of the base station. Additionally, the timing value changes in the successive stages need not be in one and the same direction, but the correct timing advance may be searched for around the estimated value, e.g. alternately from above and below said value. Thus it would be possible to make the process quicker and minimize the number of RACH bursts transmitted.

The network may control the use of the extended timing advance by means of the aforementioned control parameter. The control parameter may be used e.g. to prevent the use of the extended timing advance in cells that do not support the extended operating range. If the time slot following the CCCH time slot is not used by a traffic channel, the network may prevent the use of the extended timing advance since the bursts directed to the time slot following the CCCH time slot do not interfere with the traffic channel. The use by traffic channels of the time slot following the CCCH channel may be prevented permanently, or it may be prevented temporarily because of a light network load, for example.

The mobile station may also select a value other then zero for the first timing advance value of access bursts, especially if the mobile station is able to produce an estimate of the correct timing advance value on the basis of system information and/or measurements.

The distance of the mobile station from a base station can be estimated e.g. on the basis of the Rx level, i.e. the strength of the beacon-frequency signal received by the mobile station. The network may specify that the mobile station shall not use timing advance parameter values other than zero when the Rx level exceeds a predetermined value RXLEV, because then the mobile station is presumably within the normal operating range of the cell. Correspondingly, it is possible to apply separate RXLEV parameter values for the different timing advance parameter ranges, such as 0–63, 0–127, etc.

Let us next consider a change of serving base stations, i.e. a handover. If the mobile station receives from the system the information required for calculating an estimate for the timing advance parameter TA (synchronous or pseudosynchronous system), the handover can be carried out in the manner disclosed in the description of FIG. 2, with the exception, however, of using a timing advance parameter value greater than normal in the HANDOVER ACCESS burst. The value of the timing advance parameter may be defined directly as the estimate determined on the basis of the information from the current base station, or the estimate may be rounded e.g. to the nearest value divisible by N (including zero). It is also possible that the estimate of the timing advance parameter value is obtained from the current base station e.g. in the HANDOVER COMMAND message (so-called presynchronous system). In that case the timing advance parameter value in the HANDOVER ACCESS burst may be defined directly as the estimate received from the current base station, or the estimate may be rounded e.g. to the nearest value divisible by N (including zero).

Figure 6:
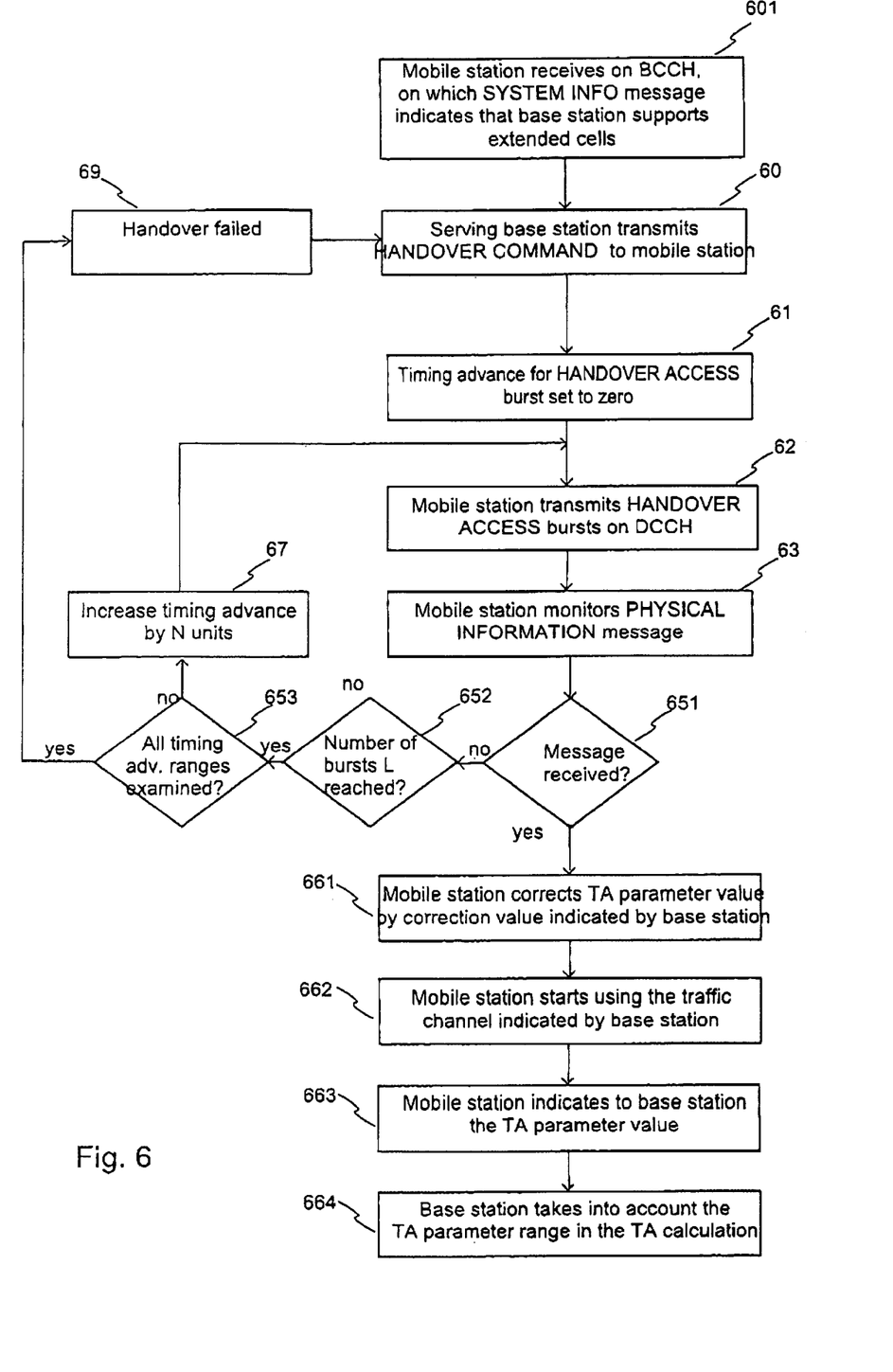
FIG. 6 shows a flow diagram of a method according to the invention for changing the serving base station.

FIG. 6 shows a flow diagram of a method according to the invention for performing a handover. Prior to the handover the mobile station receives base station transmissions on broadcast channels. A System Information message transmitted on the broadcast control channel BCCH includes information about whether the base station in question supports extended cells. This information may be included e.g. in the "Cell Options" field in the SYSTEM INFORMATION TYPE message. Alternatively, some other transmission channel may be used, such as e.g. the SACCH channel allocated to the mobile station. This way, the mobile station can perform measurements, if necessary, on the BCCH of a base station that is known to support extended cells, phase 601.

The handover starts with the current serving base station transmitting a HANDOVER COMMAND message, phase 60. This message may indicate that the new cell supports the extended operating range feature. This information may be included e.g. in the Channel Description 2 information element in the message. The mobile station is also informed about the time slot in which the burst of the HANDOVER ACCESS message should be transmitted. The mobile station sets the timing advance parameter value used in the HANDOVER ACCESS burst as TA=0, phase 61, and at first transmits HANDOVER ACCESS messages on the DCCH channel in the conventional manner using the timing advance value TA=0, phase 62.

The mobile station also monitors the PHYSICAL INFORMATION messages transmitted by the base station, phase 63. The mobile station transmits ACCESS bursts until it receives a response message from the base station, 651, or until a predetermined maximum number L of ACCESS bursts have been transmitted, 652. If after L bursts the mobile station has not received a response message from the base station, the mobile station according to the invention increases the timing advance used in the ACCESS burst by N, which preferably equals the number of timing advance parameters used in normal operation, phase 67. In this case N=64, so the mobile station sets the timing advance for the ACCESS burst as TA=64 and starts transmitting RACH bursts to the same base station using this new timing advance, phase 62. It should be noted that the magnitude of the step of change of the timing advance may also be other than that given here.

If the mobile station still does not receive a response from the base station, it further increases the timing advance parameter value by N, phase 67, so in this case the new timing advance parameter value is TA=128. The mobile station then transmits a maximum of L ACCESS bursts to the same base station using the new timing advance. If the mobile station still does not receive a response from the base station, it further increases the timing advance parameter value by N, i.e. sets the timing advance value TA=192, and begins to transmit ACCESS bursts to the same base station using this timing advance. Thus in successive stages the mobile station determines whether the distance between the mobile station and base station corresponds to timing advance value 0–63, 64–127, 128–191 or 192–255. If the mobile station does not receive a PHYSICAL INFORMATION message from the base station for a HANDOVER ACCESS burst transmitted using any of the aforesaid timing advance parameters, it informs the current base station that the handover was unsuccessful, phases 653, 69.

As the mobile station receives a PHYSICAL INFORMATION message from the base station it then sets the value of the timing advance parameter TA such that the value equals the value used in the last such HANDOVER ACCESS burst to which the base station responded summed with a timing advance correction value indicated in the PHYSICAL INFORMATION message, phase 661, and starts to use the traffic channel indicated by the base station, phase 662. In phase 663 the mobile station transmits a message to the base station on the SACCH channel indicating the timing advance parameter value used. Then, if the base station learns that the timing advance value used by the mobile station is not within the range 0–63, it takes the real timing advance into account when determining the next timing advance values, 664. When receiving the next timing advance value from the base station the mobile station may verify whether the base station took into account the timing advance step used by the mobile station, after which the mobile station starts to use the timing advance parameter values indicated by the base station. Finally, the mobile station transmits a HANDOVER COMPLETE message to the base station, after which the old base station no more serves the mobile station.

It should be noted that instead of the HANDOVER ACCESS and PHYSICAL INFORMATION messages mentioned above it is also possible to use in the handover other messages, such as the CHANNEL REQUEST and IMMEDIATE ASSIGNMENT messages described in connection with FIG. 5. One way of changing the serving base station is the so-called call re-establishment procedure. The procedure corresponds to a situation in which the connection between the mobile station and base station, which for some reason has been lost, is re-established. In a handover, the mobile station may be notified using the HANDOVER COMMAND that the connection with the new base station will be established using the call re-establishment procedure. This information may be included e.g. in the Channel Description 2 information element in the message. After that, it is possible to use substantially the signaling shown in FIG. 5, with the exception, however, that the establishment cause field in the CHANNEL REQUEST message contains "Call re-establishment". It should be noted that the call re-establishment procedure can be applied in a handover regardless of whether the handover is directed to an extended operating range of the base station or whether the base station supports extended operating range. The procedure may also be applied without using a timing advance or extended timing advance in the CHANNEL REQUEST burst. In addition, the call re-establishment procedure can be used in both synchronous and asynchronous handover.

If the handover is asynchronous, the mobile station usually does not have the information necessary to make a timing advance estimate. As an alternative to the call re-establishment procedure described above it is possible to use a method in which a special logic channel is set up on a common control channel for access messages associated with the handover. The logic channel may be set up on the uplink common control channel CCCH e.g. in such a manner that in connection with a handover CHANNEL REQUEST messages are used that include a special identifier field, say, establishment cause, defined for this particular purpose. Another possibility is to set up on the uplink common control channel CCCH two logic channels, one of which transmits the CHANNEL REQUEST messages associated with connection establishment and the other the HANDOVER ACCESS messages. If the distance of the mobile station from the base station would require a timing advance parameter greater than the normal operating range, it is also possible to prevent the transition to extended operating range.

For the access bursts falling on the time slot used by the CCCH to disturb the traffic as little as possible, the time slot following the CCCH time slot should be assigned to a traffic channel only when the other time slots are already reserved.

On the other hand, if the time slot following the CCCH channel is prevented from traffic (only) in extended cells and if the base station can receive access bursts also during the time slot following the CCCH channel, it is possible to transmit the access bursts using the timing advance value zero. Then the access bursts fall on two time slots, but after the base station system has informed the mobile station about the correct timing advance parameter value the traffic can be transmitted in a window of one time slot. Furthermore, it can be thought that the time slot following the CCCH channel is prevented from traffic only when allowed by the traffic and/or it is likely that a mobile station is performing a handover to the extended cell in question. This way, the reduction of traffic capacity in extended cells is minimized.

Figure 7:
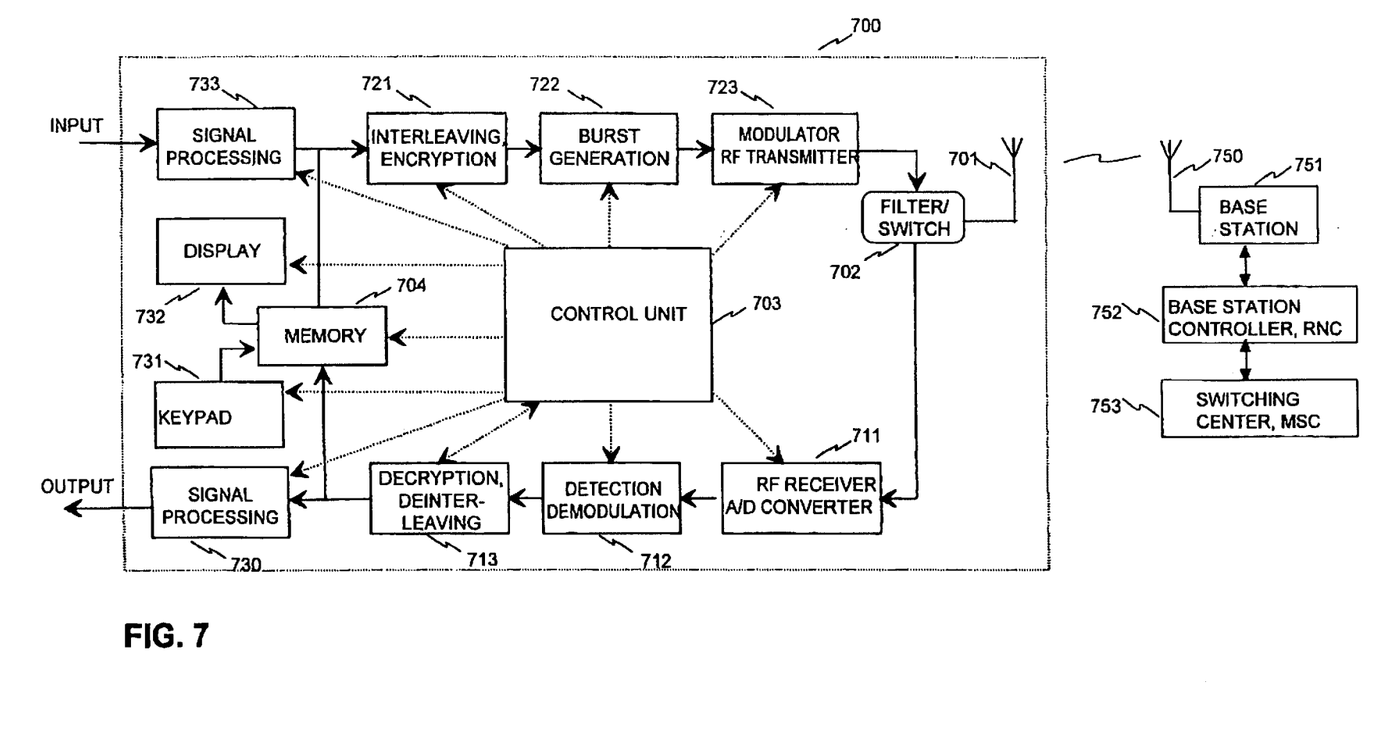
FIG. 7 shows a mobile station and cellular system according to the invention.

FIG. 7 shows in the form of simplified block diagram a mobile station 700 according to the invention and its connection to a cellular telephone network. The mobile station comprises an antenna 701 for receiving radio-frequency (RF) signals transmitted by base stations. A received RF signal is directed by a switch 702 to a RF receiver 711 where the signal is amplified and converted digital. The signal is then detected and demodulated in block 712. Block 713 performs decryption and deinterleaving. Then follows signal processing in block 730. If the received signal consists of speech, it is reproduced by means of an earphone (not shown). Received data may be stored as such in the mobile station's memory 704 or, alternatively, the processed data are taken after the signal processing to a potential external device such as a computer. A control unit 703 controls the above-mentioned reception blocks in accordance with a program stored in the unit.

Transmission from the mobile station is performed e.g. as follows. Controlled by the control block 703, block 733 performs possible signal processing on the speech signal or data and block 721 performs interleaving and encryption on the processed signal to be transmitted. Bursts are generated from the encoded data, block 722, which are modulated and amplified into a RF signal to be transmitted, block 723. The RF signal to be transmitted is led to an antenna 701 through a switch 702. The processing and transmission functions described above are, too, controlled by the control unit 703.

In the mobile station of FIG. 7, the components that are essential from the invention's perspective include the prior-art reception blocks 711–713, by means of which the mobile station receives, demodulates and decodes the messages transmitted by base stations, as well as the control block 703 which processes the information contained in the messages and controls the operation of the mobile station. Part of the memory 704 of the mobile station can be allocated to information relating to extended cells in accordance with the invention. The terminal uses the transmission blocks 721–723 to transmit to base stations the messages according to the invention associated with handovers and establishment of connections to base stations, and the control block 703 is used to set the timing advances of ACCESS messages in accordance with the invention.

FIG. 7 also shows how the mobile station is connected to the cellular system. The cellular system comprises a plurality of base stations, 751, which transmit and receive RE signals through antennas 750. One or more base stations are controlled by a base station controller 752. Several base station controllers are connected to a mobile switching center 753. The mobile switching center may be connected to other mobile switching centers and other data transmission systems.

The hardware requirements caused by the invention on base stations and terminals are not great. Base station 0.751 and/or base station controller 752 have access to a database (not shown in FIG. 7) containing information about extended cells. An operator usually has operation and maintenance (OM) capabilities for altering the contents of such databases statically, i.e. permanently (e.g. when a new base station starts operation in the vicinity of existing base stations), or dynamically. Generation and transmission of messages associated with information contained in the database can be realized using prior-art means 751, 752 programmed so as to carry out signaling according to the invention.

Naturally the embodiments described above are exemplary only and do not limit the application of the invention. Particularly it should be noted that although the examples described above are related to the GSM system, the invention is applicable to any other digital cellular system as well. Especially the High-Speed Circuit-Switched Data (HSCSD) service and General Packet Radio Service (GPRS) associated with the GSM system could be mentioned as examples of time-division systems.

When applied to the GPRS system, a mobile station according to current specifications cannot inform a base station about the correct TA parameter value. However, this information can be added to PACCH (Packet Associated Control Channel) signaling, e.g. to a PACKET MEASUREMENT REPORT message sent to the base station. Then, as the base station notices that the mobile station is using a timing advance parameter value different from the one assigned to it, it takes it into account in the timing advance parameter calculation, after which the mobile station begins to use on the traffic channel the timing advance parameter value indicated by the base station.

According to a second alternative, the mobile station does not inform the base station about the correct timing advance parameter value, but the mobile station constantly takes into account the parameter step that must be added to the timing advance indicated by the base station. It is then possible that the timing advance indicated by the base station becomes negative, whereby the mobile station has to reduce the magnitude of the parameter step used.

Like in a circuit-switched system, the mobile station preferably allows the first timing advance value to be determined on the basis of an estimate of the distance between the base station and mobile station whereby it is possible to reduce the number of ACCESS burst transmissions and make the establishment of the connection quicker.

The high-speed circuit-switched data (HSCSD) service uses more than one time slot for the traffic of one connection. Then it has to be taken into consideration that increasing the timing advance has an effect on the time available to the mobile station for shifting into the transmission and reception frequencies.

The present invention may also be applied in CDMA systems where it is possible to realize the extended operating range without increasing the number of RACH receivers. In an embodiment according to the invention the base station transmits to the mobile station information on the broadcast channel indicating that it supports extended operating range. In the connection establishment the mobile station begins the conventional transmission of RACH bursts and if it does not receive a response from the base station, it changes the RACH burst timing advance preferably by 2*X/c, where c is the speed of propagation of the radio wave and X is the normal maximum operating distance in the normal operating range. Thus the timing advance value is increased until the mobile station receives a response from the base station. In a system in which the normal operating distance is 9 km, the corresponding timing advance is 62.5 µs, by which step the timing advance can be advantageously increased.

In addition, it has to be taken into account that the aforementioned characteristics of the invention are not restricted to a certain situation for setting up a connection between a base station and mobile station, such as e.g. a handover, but they can be applied to a variety of situations in which it is necessary to establish a connection.

Above it was described features associated with the establishment of a connection between a mobile station and base station. These include e.g. the use of extended timing advance in an access burst, the use of certain logic channels, messages and fields in access bursts, and the allocation of time slots for access bursts received at a base station. It should be noted that these features can be inventional independent of each other.

What is claimed is:

1. A method for establishing a connection between a mobile station and base station where extended timing advance is used in traffic data transmission and where the mobile station transmits to the base station an access burst (CHANNEL REQUEST, HANDOVER ACCESS), characterized in that the access burst is transmitted using a first timing advance value, transmission from the base station is monitored in order to identify a response message (IMMEDIATE ASSIGNMENT, PHYSICAL INFORMATION), and if no response message is received from the base station the access burst is transmitted using a second timing advance value, whereby said first and second timing advance values are different from each other and at least one of said two timing advance values differs from zero.

2. The method of claim 1, characterized in that the access burst is transmitted using an extended timing advance value corresponding to a range extending outside a normal operating range of a cell of the base station.

3. The method of claim 1, characterized in that the number of access bursts transmitted using one and the same timing advance is a predetermined number (M) which equals the maximum number of access bursts indicated by the base station.

4. The method of claim 1, characterized in that the difference (N) of the timing advance parameters corresponding to the first and second timing advance values equals the maximum timing advance parameter value according to the normal operating range plus one.

5. The method of claim 1, characterized in that the timing advance parameter value of the access burst is increased until a response (IMMEDIATE ASSIGNMENT, PHYSICAL INFORMATION) is received from the base station or until the maximum timing advance allowed by the system has been reached.

6. The method of claim 5, characterized in that the step of increase (N) equals the maximum timing advance parameter value according to the normal operating range plus one.

7. The method of claim 1, characterized in that the base station transmits to the mobile station a message (System Information) including information about whether the base station supports the extended operating range.

8. The method of claim 1, characterized in that the connection between the base station and mobile station is established for an ensuing data transmission connection.

9. The method of claim 8, characterized in that the access burst comprises a CHANNEL REQUEST message.

10. The method of claim 1, characterized in that the connection between the base station and mobile station is established for a handover.

11. The method of claim 10, characterized in that he access burst comprises a HANDOVER ACCESS message.

12. The method of claim 10, characterized in that the timing advance selected for the access burst is an estimate produced on the basis of system information rounded to a lower value divisible by N, where N is the number of different timing advance parameters according to the normal operating range.

13. The method of claim 10, characterized in that the handover is carried out using the call re-establishment procedure.

14. The method of claim 10, characterized in that the serving base station transmits a handover command (HANDOVER COMMAND) comprising information about the possibility of using the extended cell feature in the new serving base station.

15. The method of claim 1, characterized in that the timing advance selected for the access burst is an estimate produced on the basis of system information and/or measurements.

16. A cellular system comprising processing, memory and signaling means for changing a serving base station in a time-division cellular network where extended timing advance is used in the traffic data transmission between the base station and mobile station and where the system comprises means for receiving an access burst (CHANNEL REQUEST, HANDOVER ACCESS) from the mobile station, characterized in that the base station comprises means for receiving an access burst that has a timing advance value different from zero.

17. The cellular system of claim 16, characterized in that the base station comprises means for transmitting a system info message to the mobile station, which system info message includes information about whether the base station supports the extended cell feature.

18. The cellular system of claim 16, characterized in that it comprises means for transmitting a message to the mobile station, which message indicates whether the mobile station is allowed to use an extended timing advance.

19. The cellular system of claim 16, where the base station comprises means for transmitting a timing advance parameter value to the mobile station, characterized in that the base station comprises means for receiving from the mobile station a parameter corresponding to the extended timing advance and means for producing timing advance parameter values to be indicated to the mobile station for the timing advance parameter range corresponding to the timing advance parameter value received from the mobile station.

20. The time-division cellular system of claim 16, characterized in that it comprises means for arranging channels in such a manner that the time slot following the time slot used by the common control channel (CCCH) is allocated for a traffic channel only when the other time slots are reserved.

21. A mobile station comprising means for establishing a connection between the mobile station and base station in a cellular network, where extended timing advance is used in the traffic data transmission between the base station and mobile station and where the mobile station comprises means for transmitting an access burst (CHANNEL REQUEST, HANDOVER ACCESS) to the base station, characterized in that the mobile station comprises means for transmitting an access burst that has a timing advance value different from zero, means for receiving from the base station a response message for an access burst and means for changing the value of the timing advance of the access burst if it does not receive a response message from the base station.

22. The mobile station of claim 21, characterized in that the mobile station comprises means for transmitting access bursts using at least two timing advance values.

23. The mobile station of claim 21, characterized in that it comprises means for calculating the extended timing advance value used in the actual data transmission on the basis of the timing advance value used in the access burst and a timing advance correction value received from the base station.

24. The mobile station of claim 21, characterized in that it comprises means for indicating the extended timing advance value to the base station.

* * * * *